(12) United States Patent
Kawaguchi

(10) Patent No.: US 11,308,371 B2
(45) Date of Patent: Apr. 19, 2022

(54) INFORMATION PROCESSING APPARATUS FOR DETERMINING AND DISPLAYING ERRORS

(71) Applicant: SEIKO EPSON CORPORATION, Tokyo (JP)

(72) Inventor: Yosuke Kawaguchi, Sapporo (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/160,448

(22) Filed: Jan. 28, 2021

(65) Prior Publication Data
US 2021/0241052 A1 Aug. 5, 2021

(30) Foreign Application Priority Data
Jan. 31, 2020 (JP) .............................. JP2020-014630

(51) Int. Cl.
*G06K 15/02* (2006.01)
*G06K 15/00* (2006.01)
*G06F 3/12* (2006.01)

(52) U.S. Cl.
CPC .......... *G06K 15/021* (2013.01); *G06F 3/121* (2013.01); *G06F 3/1218* (2013.01); *G06F 3/1259* (2013.01); *G06K 15/002* (2013.01); *G06K 15/4005* (2013.01); *G06K 15/4085* (2013.01)

(58) Field of Classification Search
None
See application file for complete search history.

(56) References Cited

U.S. PATENT DOCUMENTS

| 10,908,862 | B1* | 2/2021 | Takahashi | G06K 15/027 |
| 2007/0244928 | A1* | 10/2007 | Ueno | G03G 15/5079 |
| 2013/0272725 | A1* | 10/2013 | Tanaka | G03G 15/5012 |
| | | | | 399/21 |
| 2015/0002878 | A1* | 1/2015 | Naka | H04N 1/00891 |
| | | | | 358/1.14 |
| 2016/0216925 | A1 | 7/2016 | Mizuta et al. | |
| 2018/0143795 | A1* | 5/2018 | Masuzawa | G06F 3/1229 |
| 2019/0281172 | A1* | 9/2019 | Baba | G06N 3/0454 |
| 2021/0255815 | A1* | 8/2021 | Kawaguchi | G06F 3/1287 |

FOREIGN PATENT DOCUMENTS

JP 2016-136309 A 7/2016

* cited by examiner

*Primary Examiner* — Miya J Williams
(74) *Attorney, Agent, or Firm* — Workman Nydegger

(57) ABSTRACT

An information printing apparatus includes a history-information acquiring section configured to acquire, from a plurality of printers, history information indicating errors that occurred in the printers and printing media used in the printers, a statistical-information acquiring section configured to acquire, based on the history information, statistical information obtained by collecting statistics of the errors for each of the printing media, and an output control section configured to cause a display section to output the statistical information for each of the printing media.

10 Claims, 6 Drawing Sheets

FIG. 3

| HISTORY INFORMATION | |
|---|---|
| JOB INFORMATION | JOB ID |
| ERROR INFORMATION | ERROR ID |
| PRINTING MEDIA SETTING INFORMATION | PRINTING MEDIA NAME |
| | PRINTING MEDIA USE AMOUNT(m) |
| | PRINTING MEDIA RESIDUAL AMOUNT |
| | PRINTING MEDIA WIDTH(m) |
| | HEATER TEMPERATURE SETTING |
| | MECHANICAL PARAMETERS |
| SETTING ENVIRONMENT INFORMATION | TEMPERATURE |
| | HUMIDITY |
| | AIR PRESSURE |

| JOB INFORMATION | JOB ID |
|---|---|
| ERROR INFORMATION | ERROR ID |
| PRINTING MEDIA SETTING INFORMATION | PRINTING MEDIA NAME |
| | PRINTING MEDIA USE AMOUNT(m) |
| | PRINTING MEDIA RESIDUAL AMOUNT |
| | PRINTING MEDIA WIDTH(m) |
| | HEATER TEMPERATURE SETTING |
| | MECHANICAL PARAMETERS |
| SETTING ENVIRONMENT INFORMATION | TEMPERATURE |
| | HUMIDITY |
| | AIR PRESSURE |

FIG. 4

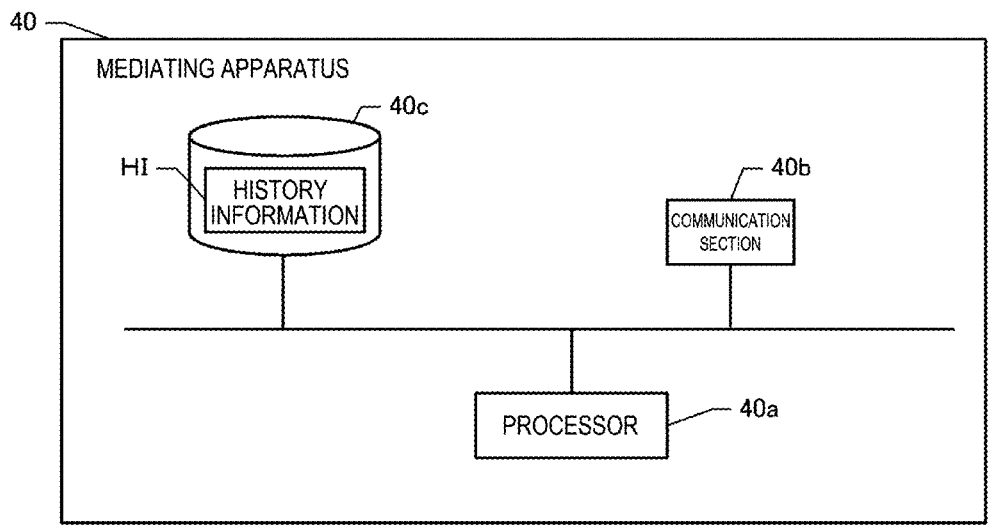

INFORMATION PROCESSING APPARATUS FOR DETERMINING AND DISPLAYING ERRORS

The present application is based on, and claims priority from JP Application Serial Number 2020-014630, filed Jan. 31, 2020, the disclosure of which is hereby incorporated by reference herein in its entirety.

BACKGROUND

1. Technical Field

The present disclosure relates to an information processing apparatus, a non-transitory computer-readable computer medium storing an image processing program, and an information processing method and, more particularly, to user authentication.

2. Related Art

There has been known a technique for, in a factory or the like that causes a plurality of printers to operate, collecting information for managing the printers. For example, JP-A-2016-136309 (Patent Literature 1) discloses a technique for collecting, through communication, operation information that changes according to the operation of each of a plurality of printers.

In the related art described above, the operation information of each of the plurality of printers can be grasped. On the other hand, in a factory or the like that prints a variety of printing media in order to obtain printed objects such as signages corresponding to received orders, it has been difficult to specify efficiency of use of each of the printing media used for the printing.

SUMMARY

An information printing apparatus for solving the problem described above includes: a history-information acquiring section configured to acquire, from a plurality of printers, history information indicating errors that occurred in the printers and printing media used in the printers; a statistical-information acquiring section configured to acquire, based on the history information, statistical information obtained by collecting statistics of the errors for each of the printing media; and an output control section configured to cause a display section to output the statistical information for each of the printing media.

BRIEF DESCRIPTION OF THE DRAWINGS

FIG. 3 is a diagram showing history information.

FIG. 4 is a block diagram showing the configuration of a mediating apparatus.

DESCRIPTION OF EXEMPLARY EMBODIMENTS

Embodiments of the present disclosure are explained according to order described below.
(1) System configuration
(1-1) Configuration of a printer
(1-2) Configuration of a mediating apparatus
(1-3) Configuration of an information processing apparatus
(1-4) Configuration of an information processing terminal
(2) History information transmission processing
(3) Information output processing
(4) Other embodiments

(1) System Configuration

Figure 1:
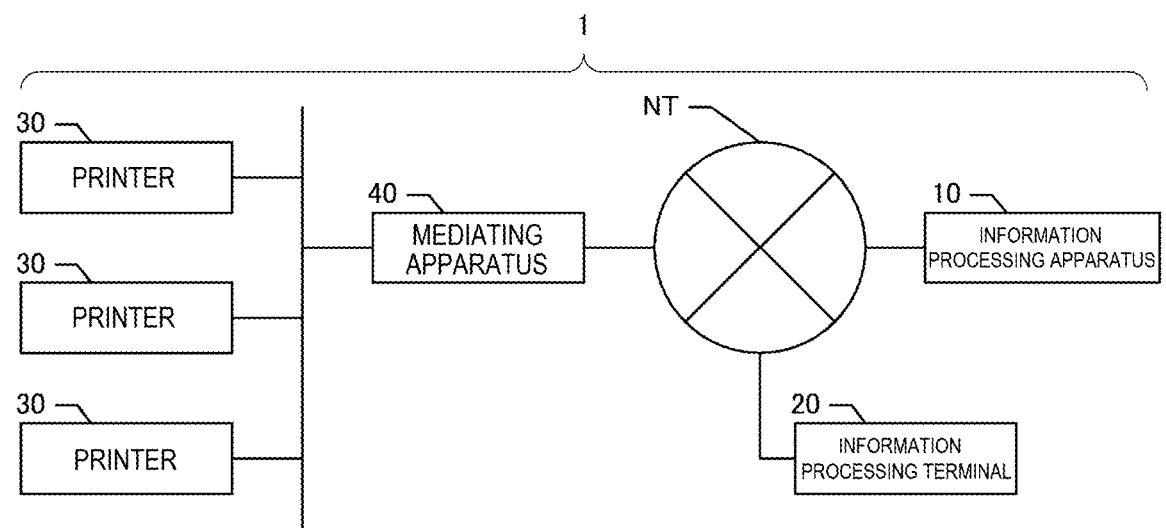
FIG. 1 is a block diagram showing an information collection system including an information processing apparatus.

FIG. 1 is a diagram schematically showing an example of an information collection system including an information processing apparatus. An information collection system 1 includes an information processing apparatus 10, an information processing terminal 20, a printer 30, and a mediating apparatus 40. In this embodiment, the information processing apparatus 10, the information processing terminal 20, and the mediating apparatus 40 are capable of communicating with one another via the Internet NT.

In this embodiment, the information processing apparatus 10 collects and records history information indicating a history of printing by the printer 30. The mediating apparatus 40 is coupled to a plurality of printers 30, acquires the history information collected in the printers 30, and transmits the history information to the information processing apparatus 10 via the Internet NT. The numbers of mediating apparatuses 40 and printers 30 are not limited. Different mediating apparatuses 40 may collect history information from each of printers 30 set in different facilities.

Figure 7:
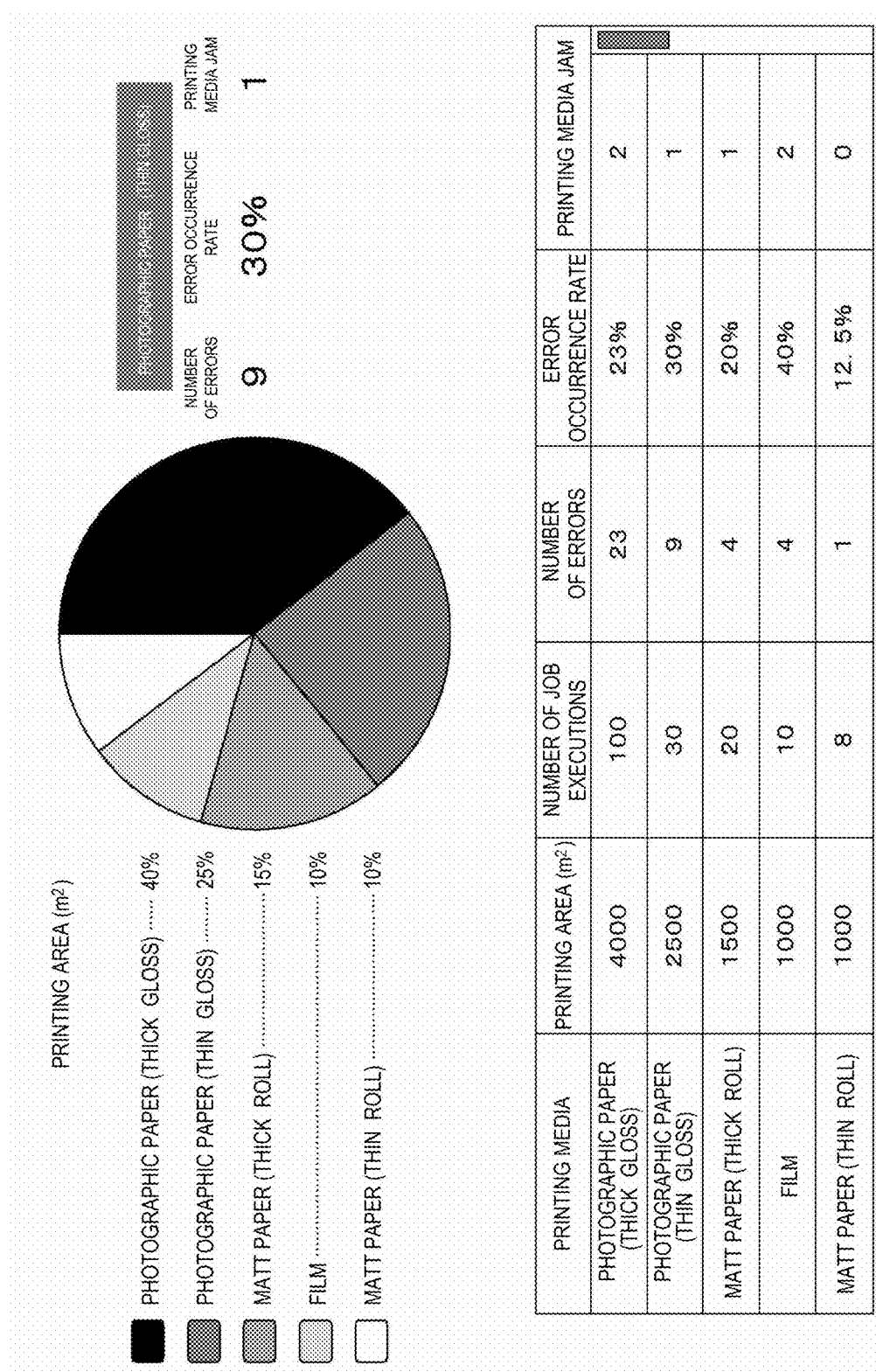
FIG. 7 is a diagram showing a display example of statistical information.

In this embodiment, the information processing apparatus 10 collects statistics of history information according to a default trigger (for example, every fixed time or every generation of an information transmission request) and generates statistical information. The information processing terminal 20 is a terminal such as a tablet terminal with which the statistical information generated by the information processing apparatus 10 can be viewed. That is, when a user of the information processing terminal 20 operates the information processing terminal 20 and performs a viewing request for the statistical information, the statistical information is transmitted from the information processing apparatus 10. The information processing terminal 20 receives the statistical information and causes a display section to display the statistical information. FIG. 7 shows an example of a screen displayed on the display section (details are explained below).

(1-1) Configuration of the Printer

Figure 2:
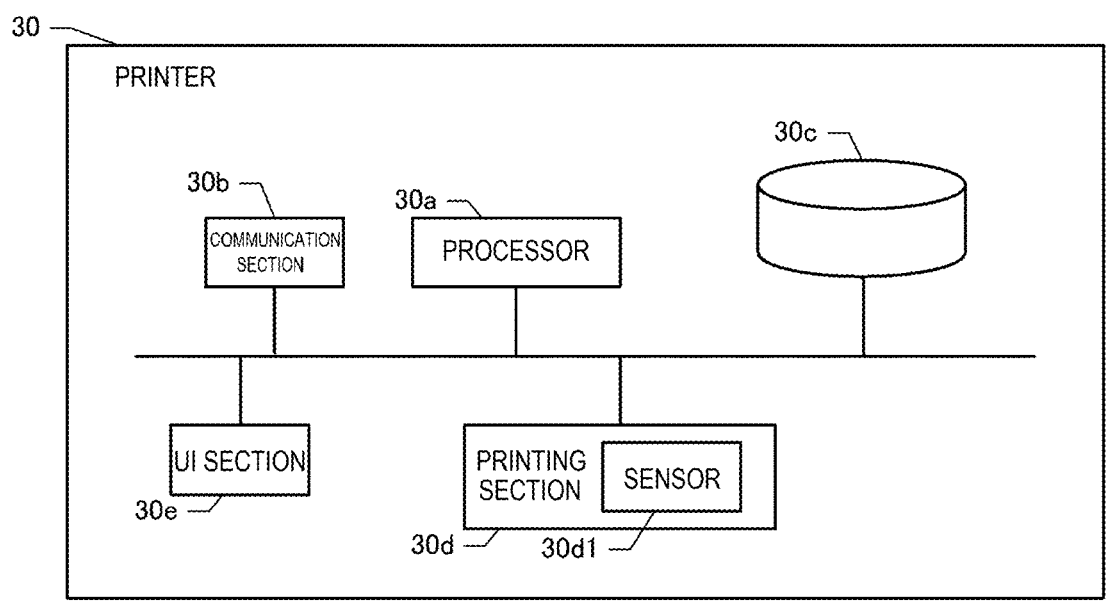
FIG. 2 is a block diagram showing the configuration of a printer.

FIG. 2 is a block diagram showing the configuration of the printer 30. The printer 30 includes a processor 30a, a communication section 30b, a nonvolatile memory 30c, a printing section 30d, and a UI section 30e. The processor 30a includes a CPU, a ROM, and a RAM not shown in FIG.

2. The processor 30*a* can execute various programs recorded in the nonvolatile memory 30*c* and control the sections of the printer 30. The processor 30*a* may be configured by a single chip or may be configured by a plurality of chips. For example, an ASIC may be adopted instead of the CPU or the CPU and the ASIC may cooperate.

The communication section 30*b* includes a communication interface for communicating with an external device according to wired or wireless various communication protocols. The communication section 30*b* includes an interface for communicating with various removable memories inserted into the printer 30. The printer 30 is capable of communicating with the mediating apparatus 40 via the communication section 30*b*.

In this embodiment, the printing section 30*d* includes an actuator, various devices, a sensor 30*d*1, a driving circuit, and machine components for executing printing on various printing media in various printing systems such as an inkjet system and an electrophotographic system. The sensor 30*d*1 includes a sensor that detects various detection targets that can change in the printer 30. Specifically, in this embodiment, the sensor 30*d*1 includes a temperature sensor, a humidity sensor, and an air pressure sensor. The printer 30 can detect, with the temperature sensor, the humidity sensor, and the air pressure sensor, temperature, humidity, and air pressure in a place where the printer 30 is set. These sensors are examples. Other detection targets may be detected by other sensors or at least a part of the sensors may be omitted.

The UI section 30*e* includes a touch panel display, various keys, and various switches. The touch panel display includes a display panel that displays various kinds of information based on control by the processor 30*a* and a touch detection panel placed on the display panel. The touch panel display detects touch operation by a human finger or the like. The processor 30*a* can acquire operation content of the user via the UI section 30*e*. The processor 30*a* can display various kinds of information on the display of the UI section 30*e* and notify the various kinds of information to the user.

In this embodiment, the user is capable of performing various settings by operating the UI section 30*e*. For example, the user is capable of designating a name of a printing medium used for printing and is capable of setting a state of the actuator in the printing executed using the printing medium. For example, when the printer 30 includes a heater for drying ink after printing, the user is capable of setting a heater temperature (a target temperature).

Various settings are possible in the actuator included in the printer 30 as well. For example, when adjustment of a platen gap for adjusting the distance between a printing medium and a carriage in a printing region is possible, it is possible to set an adjustment value corresponding to the distance. In the printer 30 that supplies a printing medium in a wound state like roll paper or the like to the printing region, it is possible to adjust tension acting on the printing medium (media tension). These various adjustments are realizable by publicly-known various mechanisms. The user can perform various settings by operating the UI section 30*e*.

Naturally, a part of the various settings may be automatically performed. For example, when a printing media name is set, setting values adjusted to a printing medium may be automatically set for other setting items. In this case as well, setting of any items may be changeable. The printer 30 may read out a document, image data, or the like from a recording printing medium coupled to the printer 30 and execute a printing job or may execute a printing job instructed from a computer coupled to the printer 30. In the latter case, various setting may be specified by a printer driver executed by the computer.

In this embodiment, a plurality of printers 30 are set in a facility of a printing company. Printing can be carried out in parallel according to various printing requests received by the printing company. The printing company can own a plurality of facilities. A plurality of printers 30 can be set in each of the facilities. Further, a different plurality of printing companies can operate a plurality of printers 30 in a facility of each of the printing companies.

In this embodiment, when executing a printing job, each of the printers 30 generates history information indicating a history of printing and transmits the history information to the mediating apparatus 40. Accordingly, in this embodiment, a not-shown history information transmission program is recorded. When the printing job is executed, the processor 30*a* executes transmission processing according to the history information transmission program.

FIG. 3 is a diagram showing an example of history information HI transmitted from the printer 30. In this embodiment, the history information HI is generated for each of printing jobs. The history information HI includes job information, error information, printing media setting information, and setting environment information. The job information is information for identifying the printing job and is a job ID for identifying the printing job in this embodiment. The processor 30*a* specifies the job ID based on predetermined rules and includes the job ID in the history information HI. Naturally, the job information may be information of other forms, for example, an execution date and time of the printing job.

The error information is information indicating a type of an error that occurred in a process of the printing job. The processor 30*a* is capable of detecting an end of the printing job (for example, detecting that conveyance of a default amount of printing media is executed after a default amount of printing). When an error occurs in the printer 30 in the process of the printing, the processor 30*a* is capable of detecting the occurrence of the error and specifying a type of the error. That is, forms of errors are determined in advance and an error ID is given in advance for each of the forms of the errors such as a conveyance stop of printing media and a deficiency of ink ejection. The processor 30*a* is capable of detecting that errors of various forms have occurred. The processor 30*a* specifies an error ID corresponding to a form of a detected error and includes the error ID in the history information HI.

The printing media setting information is information concerning setting of a printing medium and indicates setting concerning a printing medium set by, for example, operation on the UI section 30*e*. Specifically, in this embodiment, the printing media setting information includes a printing media name, a printing media use amount, a printing media residual amount, a printing media width, heater temperature setting, and mechanical parameters.

That is, when the printing job is executed, the processor 30*a* specifies a set printing media name and includes the printing media name in the history information HI. The processor 30*a* specifies a conveyance amount (length in a conveying direction) of a printing medium conveyed in printing by the printing job and acquires the conveyance amount as a printing media use amount. The conveyance amount of the printing medium may be detected by a sensor, may be detected according to, for example, a rotation amount of a conveying roller, maybe specified based on the size of a printing region, or may be various forms. In order to regard a non-printing region as a region not in use when the printing is stopped by an error, it is preferable to adopt a sensor or a form capable of specifying an actual amount of use such as a rotation amount of the conveying roller.

Further, the processor 30a specifies the printing media residual amount by subtracting the printing media use amount from the printing media residual amount before the printing job start and includes the printing media residual amount in the history information HI. The printing media residual amount before the printing job start is recorded in the nonvolatile memory 30c. In the case of first printing after a start of accumulation of printing media in the printer 30, the printing media residual amount is an initial accumulation amount. Naturally, a unit of the printing media use amount and the printing media residual amount is optional and may be various units, for example, the number of pieces other than the length. A residual amount of a printing medium may be specified by a printing media residual amount sensor.

Further, the processor 30a specifies a printing media width (length in a direction orthogonal to the conveying direction) of the used printing medium and includes the printing media width in the history information HI. The printing media width maybe specified by various methods. For example, it is possible to adopt a configuration in which printing media widths are associated with printing media names in advance and recorded in the nonvolatile memory 30c and the processor 30a acquires the printing media width. The printing media width may be detected by a sensor or the like.

Further, the processor 30a specifies a setting temperature for a heater for drying ink after printing and includes the setting temperature in the history information HI. Further, the processor 30a specifies mechanical parameters (a media tension, a platen gap, a printing media feeding amount, a drying time, and the like) of a mechanism of the printer 30 and includes the mechanical parameters in the history information HI.

The setting environment information is information concerning an environment that can affect printing media. The processor 30a acquires detection values of the temperature sensor, the humidity sensor, and the air pressure sensor included in the sensor 30d1. The processor 30a includes the detection values of temperature, humidity, and air pressure in the history information HI. When the printing job ends or is suspended by an error, the processor 30a generates the history information HI explained above. Further, the processor 30a transmits the history information HI to the mediating apparatus 40 via the communication section 30b.

(1-2) Configuration of the Mediating Apparatus

FIG. 4 is a block diagram showing the configuration of the mediating apparatus 40. The mediating apparatus 40 includes a processor 40a, a communication section 40b, and a nonvolatile memory 40c. The processor 40a includes a CPU, a ROM, and a RAM not shown in FIG. 4. The processor 40a can execute various programs recorded in the nonvolatile memory 40c and control the sections of the mediating apparatus 40. The processor 40a may be configured by a single chip or may be configured by a plurality of chips. An ASIC may be adopted instead of the CPU or the CPU and the ASIC may cooperate.

The communication section 40b includes a communication interface for communicating with an external device according to wired or wireless various communication protocols. The mediating apparatus 40 is capable of communicating with the printer 30 and the information processing apparatus 10 via the communication section 40b. In this embodiment, the processor 40a executes a not-shown information mediating program recorded in the nonvolatile memory 40c. When the information mediating program is executed, the processor 40a stays on standby fora transmission request for the history information HI to be output from the printer 30. When the transmission request is performed, the processor 40a acquires the history information HI from the printer 30, which performs the request, via the communication section 40b and records the history information HI in the nonvolatile memory 40c.

Further, the processor 40a transmits the history information HI to the information processing apparatus 10 via the communication section 40b. As a result, the information processing apparatus 10 accumulates the history information HI. Transmission timing of the history information HI may be various timings or may be every fixed period or the like. For example, a configuration maybe adopted in which the mediating apparatus 40 outputs a transmission request for the history information HI to the printer 30 and the printer 30 transmits the history information HI in response to the transmission request.

(1-3) Configuration of the Information Processing Apparatus

Figure 5:
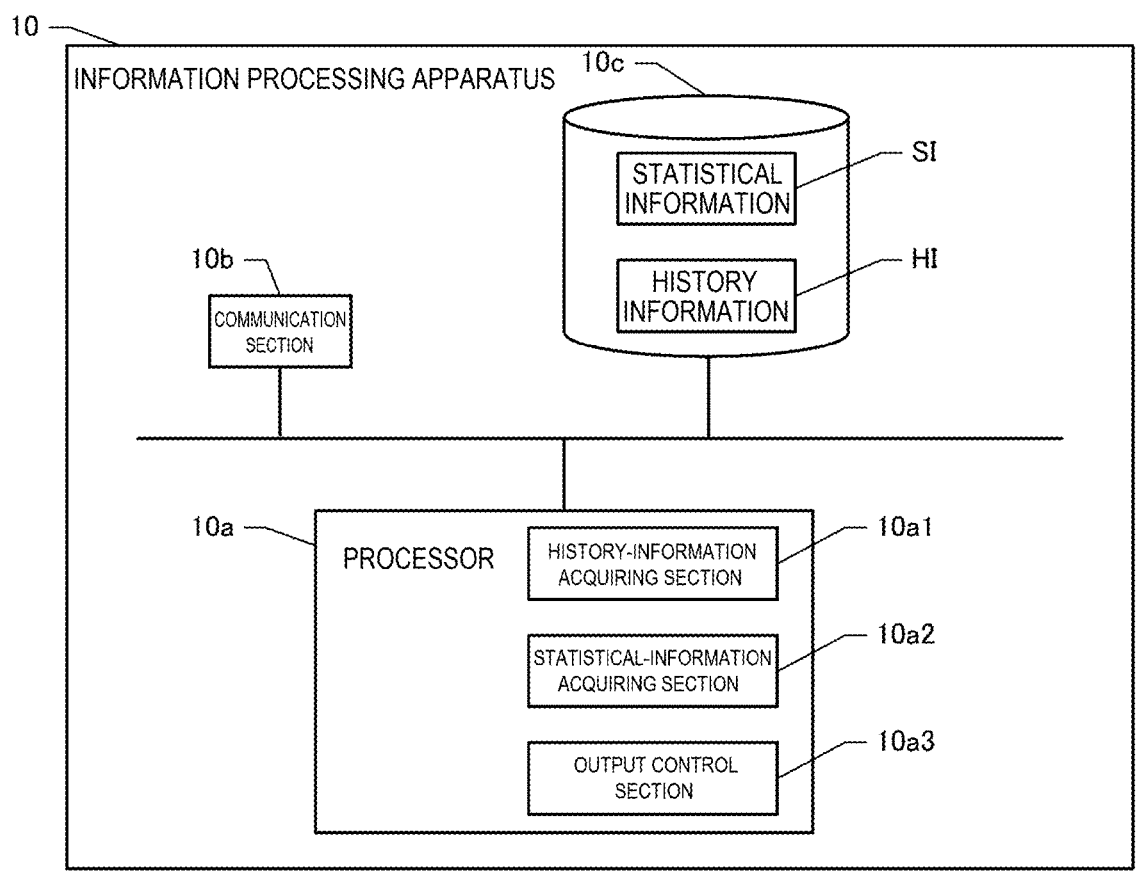
FIG. 5 is a block diagram showing the configuration of an information processing apparatus.

FIG. 5 is a block diagram showing the configuration of the information processing apparatus 10. The information processing apparatus 10 includes a processor 10a, a communication section 10b, and a nonvolatile memory 10c. The processor 10a includes a CPU, a ROM, and a RAM not shown in FIG. 5. The processor 10a can execute various programs recorded in the nonvolatile memory 10c and control the sections of the information processing apparatus 10. The processor 10a may be configured by a single chip or may be configured by a plurality of chips. An ASIC may be adopted instead of the CPU or the CPU and the ASIC may cooperate.

The communication section 10b includes a communication interface for communicating with an external device according to wired or wireless various communication protocols. The information processing apparatus 10 is capable of communicating with the mediating apparatus 40 and the information processing terminal 20 via the communication section 10b. The history information HI is collected from the plurality of printers 30 by the mediating apparatus 40 and transmitted to the information apparatus 10 to be recorded in the information processing apparatus 10. The information processing apparatus 10 can perform various analyses relating to the printer 30 by analyzing the history information HI.

In this embodiment, statistical information for supporting selection of printing media used in the printer 30 is generated according to the analysis. Accordingly, the processor 10a executes a not-shown information processing program recorded in the nonvolatile memory 10c. When the information processing program is executed, the processor 10a functions as a history-information acquiring section 10a1, a statistical-information acquiring section 10a2, and an output control section 10a3.

The history-information acquiring section 10a1 has a function of acquiring, from a plurality of printers, the history information HI indicating errors that occurred in the printers and printing media used in the printers. That is, with the function of the history-information acquiring section 10a1, the processor 10a receives the history information HI from the mediating apparatus 40 via the communication section 10b. When the history information HI is acquired, with the function of the history-information acquiring section 10a1, the processor 10a records the history information HI in the nonvolatile memory 10c. Collection timing of the history information HI may be various timings or may be every fixed period or the like. For example, a configuration maybe adopted in which a transmission request for the history information HI is performed from one of the mediating apparatus 40 and the information processing apparatus 10 and communication for exchange of the history information HI is performed in response to the transmission request.

The statistical-information acquiring section 10a2 has a function of acquiring, based on the history information HI, statistical information SI obtained by collecting statistics of errors for each of printing media. With the function of the statistical-information acquiring section 10a2, the processor 10a generates the statistical information SI for each of predetermined triggers (for example, every fixed period or statistical information request time) based on the history information HI. The statistical information SI only has to be information obtained by collecting statistics of errors for each of printing media. In this embodiment, with the function of the statistical-information acquiring section 10a2, the processor 10a refers to the history information HI, converts the history information HI into information for each of the same printing media, and sets the information as the statistical information SI. At this time, with the function of the statistical-information acquiring section 10a2, the processor 10a calculates statistical values concerning default items.

In this embodiment, with the function of the statistical-information acquiring section 10a2, the processor 10a calculates the number of job executions, the number of error executions, and an error occurrence rate. That is, the processor 10a counts the number of printing jobs in which printing media having the same printing media name are used (the number of job IDs associated with the printing media having the same printing media name) and sets the number of printing jobs as the number of job executions. The processor 10a associates the number of job executions with the printing media name.

With the function of the statistical-information acquiring section 10a2, the processor 10a counts the number of error IDs associated with the printing media having the same printing media name and sets the number of error IDs as the number of errors. The processor 10a associates the number of errors with the printing media name. Further, with the function of the statistical-information acquiring section 10a2, the processor 10a acquires a value obtained by dividing the number of errors by the number of job executions as an error occurrence rate. The processor 10a associates the error occurrence rate with the printing media name. With the function of the statistical-information acquiring section 10a2, the processor 10a further associates the number of job executions, the number of errors, and the error occurrence rate with a result obtained by converting the history information HI into information for each of the same printing media names and records the number of job executions, the number of errors, and the error occurrence rate in the nonvolatile memory 10c as the statistical information SI.

The output control section 10a3 has a function of causing the display section to output statistical information for each of printing media. With the function of the output control section 10a3, the processor 10a transmits the statistical information to the information processing terminal 20 via the communication section 10b according to a transmission request for the statistical information from the information processing terminal 20. As a result, the statistical information is output to (displayed on) a display section 20d included in the information processing terminal 20.

(1-4) Configuration of the Information Processing Terminal

Figure 6:
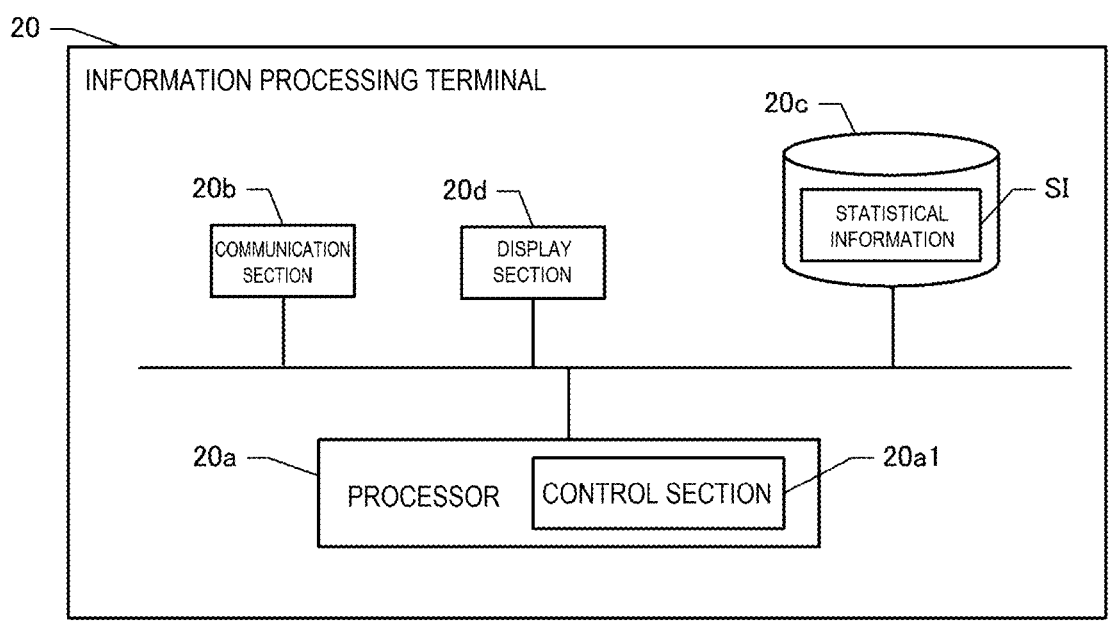
FIG. 6 is a block diagram showing the configuration of an information processing terminal.

FIG. 6 is a block diagram showing the configuration of the information processing terminal 20. The information processing terminal 20 includes a processor 20a, a communication section 20b, a nonvolatile memory 20c, and the display section 20d. The processor 20a includes a CPU, a ROM, and a RAM not shown in FIG. 6. The processor 20a can execute various programs recorded in the nonvolatile memory 20c and control the sections of the information processing terminal 20. The processor 20a may be configured by a single chip or may be configured by a plurality of chips. An ASIC may be adopted instead of the CPU or the CPU and the ASIC may cooperate.

The communication section 20b includes a communication interface for communicating with an external device according to wired or wireless various communication protocols. The information processing terminal 20 is capable of communicating with the information processing apparatus 10 via the communication section 20b. The display section 20d is a display that displays any image. The display section 20d according to this embodiment includes a touch panel functioning as an input section. Therefore, the processor 20a can acquire input content corresponding to operation on the touch panel of the display section 20d.

In this embodiment, the processor 20a executes a not-shown information processing program recorded in the nonvolatile memory 20c. When the information processing program is executed, the processor 20a functions as a control section 20a1. The control section 20a1 has a function of causing the display section to output, for each of printing media, the statistical information SI acquired based on the history information HI.

In this embodiment, the user of the information processing terminal 20 instructs a start of transmission of statistical information with, for example, operation on the touch panel of the display section 20d. When the processor 20a receives the instruction with the function of the control section 20a1, with the function of the control section 20a1, the processor 20a outputs a transmission request for the statistical information via the communication section 20b. When the information processing apparatus 10 transmits the statistical information SI in response to the transmission request, with the function of the control section 20a1, the processor 20a receives the statistical information SI via the communication section 20b and records the statistical information SI in the nonvolatile memory 20c.

With the function of the control section 20a1, the processor 20a causes the display section 20d to display the statistical information SI. FIG. 7 is a diagram showing a display example of the statistical information SI on the display section 20d. In the display example shown in FIG. 7, various kinds of information are shown in a list for each of printing media names in a lower part of FIG. 7. Information for each of the printing media names is indicated by a graph in an upper part of FIG. 7.

Specifically, a printing media name is shown in the leftmost column in the list shown in FIG. 7. A printing area, the number of job executions, the number of errors, an error occurrence rate, and a printing media jam are shown in columns on the right of the printing media name. That is, the processor 20a controls the display section 20d to display, referring to the statistical information SI, in the list, numerical values of the number of job executions, the number of errors, and the error occurrence rate associated with the printing media names. The processor 20a calculates, from the statistical information SI, a sum of printing media use amounts for each of the printing media names and calculates a printing area by multiplying the calculated sum by a printing media width. Further, the processor 20a acquires, from the statistical information SI, the number of occurrences of a type of a specific error (the number of occurrences of the printing media jam in the example shown in FIG. 7) for each of the printing media names. The processor 20a controls the display section 20d to display, in the list, the printing area and the printing media jam.

Further, the processor 20a generates a pie graph about one item of the information displayed in the list and controls the display section 20d to display the pie graph above the list. In the example shown in FIG. 7, a printing area for each of the printing media name is displayed as the pie graph. In the example shown in FIG. 7, specific items about a specific printing media name are written on the right side of the pie graph. That is, in the example shown in FIG. 7, the number of errors, an error occurrence rate, and the number of occurrences of the printing media jam of a printing medium having a printing media name "photographic paper (thin gloss)" are displayed.

Thick and thin in the printing media names indicate thick printing media and thin printing media. Roll in the printing media name indicates printing media stored in a wound state. FIG. 7 is a display example of the statistical information SI. Naturally, other items included in the statistical information SI may be displayed or at least a part of the items shown in FIG. 7 may not be displayed. Further, information (for example, an occurrence rate of an error of a specific type) processed based on the statistical information SI may be displayed.

The user can perform an instruction for changing display content with input operation to the display section 20d. The processor 20a changes the display content to content corresponding to the input operation. A form of the change may be various forms. For example, it may be possible to change items of display targets displayed as the pie graph. More specifically, for example, a configuration may be adopted in which the user selects the number of errors with input operation to the display section 20d to thereby cause the display section 20d to display a pie graph of the number of errors for each of the printing media names. Naturally, a form of a graph is not limited to the pie graph. Further, sorting may be possible in the list. For example, a configuration may be adopted in which the user instructs, with input operation to the display section 20d, an item and ascending order (or descending order) serving as keys in the sorting, whereby a list is displayed using any items as keys.

According to this embodiment explained above, the user can recognize, for each of the printing media, an occurrence state of errors in printing executed by the plurality of printers 30. Therefore, in a stage of starting a printing job, for example, when a user such as a printing company receives an order for a new printed object such as a signage, it is possible to specify in which printing medium an error occurrence rate is low. It is possible to easily specify a printing medium appropriate for performing printing of the printed object for which the order is received. If information concerning a type of an error is displayed, it is easy to take measures for, for example, avoiding, in a printed object in which an error of a specific type is likely to occur, a printing media name in which the error is likely to occur.

(2) History Information Transmission Processing

Figure 8:
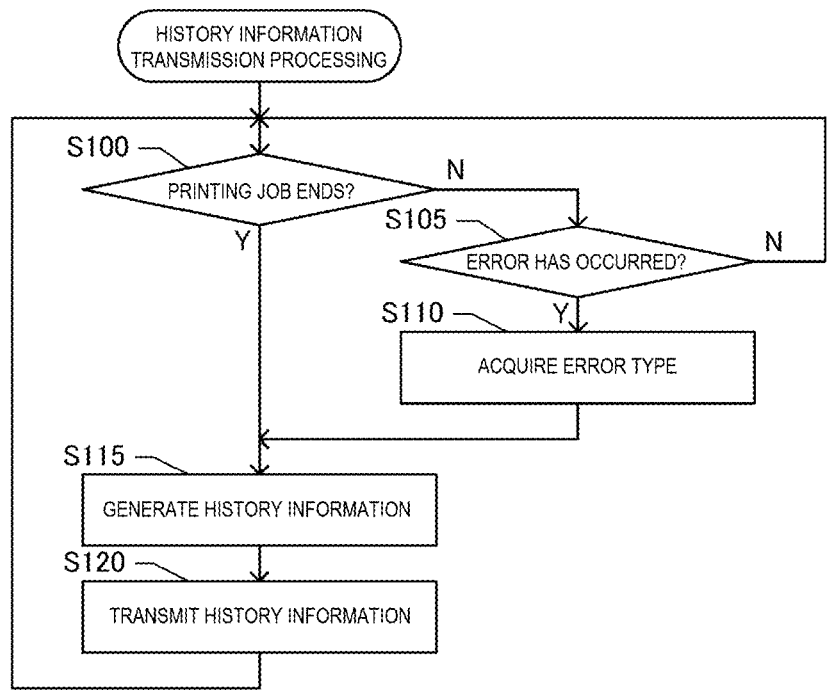
FIG. 8 is a flowchart of history information transmission processing.

FIG. 8 is a flowchart showing history information transmission processing executed by the processor 30a. The history information transmission processing is executed when the printer 30 is started. When the history information transmission processing is executed, the processor 30a determines whether a printing job ends (step S100). That is, the processor 30a executes the history information transmission processing until an end command for the printing job and determines that the printing job ends when processing by commands are carried out to the last.

When not determining in step S100 that the printing job ends, the processor 30a determines whether an error has occurred (step S105). That is, the processor 30a regards that an error has occurred when not all of kinds of processing up to the end command of the printing job are not executed to the last and the printing stops. When not determining in step S105 that an error has occurred, the processor 30a repeats the processing in step S100 and subsequent steps.

When determining in step S105 that an error has occurred, the processor 30a acquires a type of the error based on states of the sections of the printing section 30d (step S110). When determining in step S100 that the printing job ends or when acquiring the error type in S110, the processor 30a generates the history information HI concerning a printing job started to be executed immediately before the printing job (step S115). That is, the processor 30a generates a job ID and associates the job ID with the history information HI. The processor 30a refers to setting during the execution of the printing job, acquires a printing media name, a printing media width, heater temperature setting, and mechanical parameters, and associates the printing media name, the printing media width, the heater temperature setting, and the mechanical parameters with the history information HI.

Further, the processor 30a specifies a printing media use amount based on a conveyance amount (length in a conveying direction) of a printing medium conveyed in printing by the printing job. The processor 30a specifies a printing media residual amount based on the printing media use amount. The processor 30a associates the printing media use amount and the printing media residual amount with the history information HI. Further, the processor 30a acquires temperature, humidity, and air pressure of a setting environment of the printer 30 based on an output of the sensor 30d1 and associates the temperature, the humidity, and the air pressure with the history information HI.

Further, when step S115 is executed through step S110, the processor 30a further associates error information with the history information HI. That is, the processor 30a associates an error ID corresponding to the type of the error acquired in step S110 with the history information HI.

Subsequently, the processor 30a transmits the history information HI (step S120). That is, the processor 30a outputs a transmission request to the mediating apparatus 40 via the communication section 30b. When the mediating apparatus 40 responds to the transmission request, the processor 30a transmits the history information HI to the mediating apparatus 40 via the communication section 30b. Thereafter, the processor 30a repeats the processing in step S100 and subsequent steps. In the mediating apparatus 40, the processor 40a transmits the history information HI to the information processing apparatus 10 via the communication section 40b at default timing. At this time, after transmitting the history information HI to the information processing apparatus 10 last time, the mediating apparatus 40 transmits the history information HI acquired anew to the information processing apparatus 10. As a result, the information processing apparatus 10 can collect the history information HI of a history of each of printing jobs executed in each of the plurality of printers 30.

(3) Information Output Processing

Figure 9:
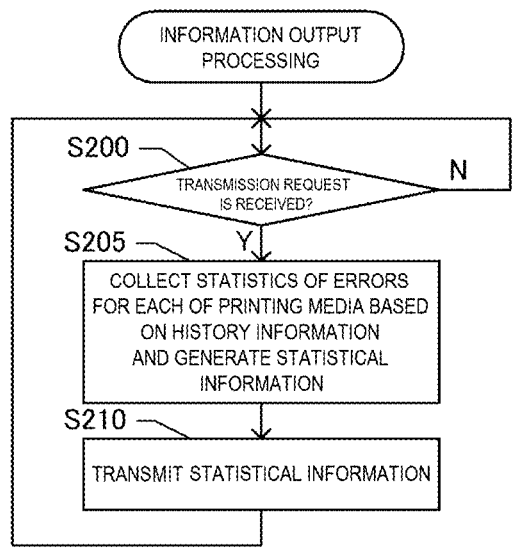
FIG. 9 is a flowchart of information output processing.

FIG. 9 is a flowchart showing information output processing executed by the processor 10a. The information output processing is executed in a state in which the history information HI is recorded in the nonvolatile memory 10c of the information processing apparatus 10. In the information processing terminal 20, when the user instructs a start of transmission of statistical information with, for example, operation on the touch panel of the display section 20d, the processor 20a transmits a transmission request for the statistical information to the information processing apparatus 10 via the communication section 20b.

With the function of the statistical-information acquiring section 10a2, the processor 10a monitors, via the communication section 10b, whether the transmission request is received (step S200). When determining in step S200 that the transmission request is received, the processor 10a collects statistics of errors for each of printing media based on the history information HI and generates the statistical information SI (step S205).

That is, with the function of the statistical-information acquiring section 10a2, the processor 10a carries out, for each of printing media names, processing for referring to the history information HI recorded in the nonvolatile memory 10c, extracting information associated with the same printing media name, converting the information into information associated with the printing media name, and generating the statistical information SI for each of the printing media. Further, with the function of the statistical-information acquiring section 10a2, the processor 10a calculates the number of job executions, the number of error executions, and an error occurrence rate for each of the printing media names based on the statistical information SI. The processor 10a associates the calculated number of job executions, the calculated number of error executions, and the calculated error occurrence rate with the printing media names of the statistical information SI.

Subsequently, with the function of the output control section 10a3, the processor 10a transmits the statistical information SI (step S210). That is, the processor 10a transmits the statistical information SI to the information processing terminal 20 via the communication section 10b. When the information processing terminal 20 receives the statistical information SI, the processor 20a controls the display section 20d to display the statistical information SI. As a result, display of the statistical information SI shown in FIG. 7 is performed.

(4) Other Embodiments

The embodiment explained above is an example for carrying out the present disclosure. Other various embodiments are adoptable. For example, in the embodiment explained above, the mediating apparatus 40 collects history information and transmits the history information to the information processing apparatus 10. However, the history information may be directly transmitted from the printer 30 to the information processing apparatus 10 not via the mediating apparatus 40. In the embodiment explained above, the history information is recorded and statistical information is generated in the information processing apparatus 10. However, at least a part of these kinds of processing may be carried out in the information processing terminal 20. Further, display of the statistical information may be performed in the display section included in the information processing apparatus 10.

Further, a form of the information processing terminal 20 is not limited to the tablet terminal and may be another portable terminal or may be a stationary terminal. The function of the information processing terminal 20 may be incorporated in the information processing apparatus 10 or the mediating apparatus 40.

The history-information acquiring section only has to be able to acquire, from a plurality of printers, history information indicating errors that occurred in the printers and printing media used in the printers. That is, the history-information acquiring section only has to be able to acquire history information that associates errors that occurred when printing was actually performed in the plurality of printers and printing media in which the errors occurred. The history information is information based on which statistics of errors are collected for each of printing media and includes at least information indicating errors and printing media in which the errors occurred. A form of the information indicating the errors may be various forms. Examples of the form of the information include presence or absence of an error and identification information (an ID, a name, or the like) of a type of an occurred error. A form of the information indicating the printing media may be various forms. Examples of the form of the information include identification information (an ID, a name, or the like) of the printing media.

The history information only has to include a history of occurrence of errors and may include a history (printing media information and the like) of non-occurrence of errors. The history information may include various histories concerning printing in a printer (printing media setting information, setting environment information, information concerning a state of a printer, and the like).

An error only has to be defined such that statistics of errors for each of printing media contribute to selection of printing media. For example, a failure of printing that wastes printing media (a state in which a printing result is not an printed object) may be set as an error. An event in which printing media are not wasted but printing is suspended and reprinting is necessary may be set as an error or may not be set as an error. Presence or absence of an error only has to be measured for each of default units . For example, presence or absence of an error may be defined for each of printing jobs or may be defined for each of printings on printing media having a fixed length.

Printing media are used in a printer and are targets on which printing is performed. Therefore, the printing media are not limited to paper. Printable targets such as cloth and various kinds of resin can be the printing media. Printing media associated with errors only have to be defined to contribute to selection of printing media. For example, the printing media may be defined by identification information (an ID, a name, or the like) of the printing media. The printing media may be defined for each of choices of the printing media for the printer. Specifically, when supply forms of printing media of the same type are different like cut paper and roll paper, the printing media maybe defined as different printing media.

The printing media can be defined in various forms. For example, the printing media may be defined by classifying types of the printing media according to characteristics (materials of the printing media themselves, types of coat materials, thicknesses, supply forms, and the like) of the printing media. The printing media may be defined by classifying types of the printing media according to uses (photograph printing, character printing, poster printing, and the like) of the printing media. Further, the printing media may be defined by classifying the types of the printing media according to manufacturers of the printing media. Naturally, the printing media may be defined by a combination of these definitions.

The statistical-information acquiring section only has to be able to acquire, based on the history information, statistical information obtained by collecting statistics of errors for each of the printing media. That is, the statistical-information acquiring section only has to be able to acquire, as the statistical information, at least information concerning the number of errors for each of the printing media. Collection of statistics may be carried out in various forms. Statistics of the number of occurrence of errors may be collected or statistics of an error occurrence rate may be collected. Naturally, in addition to the collection of the statistics of the errors for each of the printing media, collection of detailed statistics, for example, statistics of each of types of errors may be carried out.

The output control section only has to be able to cause the display section to output the statistical information for each of the printing media. That is, the output control section only has to be able to output the statistical information for each of the printing media to the display section visually recognized by a person involved in the selection of printing media. The display section may be an apparatus integral with the information processing apparatus or may be another apparatus. As in the embodiment explained above, the display section and the information processing apparatus may be set in physically separated positions or may be set in near positions (for example, in the same room).

The statistical information only has to be able to support the selection of printing media. An output form of the statistical information is not limited to the form in the embodiment explained above. For example, a display form on a screen is not limited to the form in the embodiment explained above and may be output by voice or the like. The display section is not limited to a typical display and may be any display section such as an HMD (Head Mounted Display).

The setting of the printing media is at least one of settings of parameters that can change for each of the printing media among variable parameters set for the printer. For example, when a printing job is input to the printer, a type (an ID, a name, or the like) of a printing medium can be set as a parameter given to the printer driver. Further, other parameters may be automatically set according to types of the printing media. At least a part of the other parameters may be set by the user. Examples of the other parameters include a residual amount and an amount of use of the printing media, temperature of a printing media heater, and parameters (mechanical parameters: media tension, a platen gap, a printing media feeding amount, and a drying time) of the mechanism of the printer.

The setting environment information of the printer is information concerning an environment that can affect the printing media. The setting environment information of the printer may be a part of information selected out of the temperature, the humidity, and the air pressure or may be other information, for example, presence or absence of inclination of a surface on which the printer is set, presence or absence of vibration and noise, and brightness.

In the embodiment explained above, the statistical information is acquired and displayed for each of the printing media names included in the printing media setting information. However, the statistical information may be acquired and displayed based on other information. For example, in the embodiment explained above, the history information HI includes the error information, the printing media setting information, and the setting environment information. Therefore, with the function of the statistical-information acquiring section $10a2$, the processor $10a$ may acquire the statistical information SI for at least each one kind of information of the history information HI.

In this case, with the function of the output control section $10a3$, the processor $10a$ causes the display section $20d$ to output the statistical information SI collected as statistics for at least each one kind of information among the error information, the printing media setting information, and the setting environment information. As a result, the user can perform an examination for selecting various kinds of information included in the history information HI. For example, if statistics of errors are collected for each of mechanical parameters included in the history information HI and displayed, the user can perform an examination for selecting mechanical parameters in which an error less easily occurs.

Further, the statistical information may be used for an improvement proposal for various elements in a printing job. For example, with the function of the output control section $10a3$, the processor $10a$ may cause the display section $20d$ to display an improvement proposal for reducing errors. Accordingly, the processor $10a$ specifies an item that should be improved. The item may be various items included in the history information HI (the statistical information SI). For example, when a change of a printing medium is performed, a printing media name is the item that should be improved. In this case, with the function of the output control section $10a3$, the processor $10a$ specifies, based on the statistical information SI, a printing medium, an error occurrence rate of which is relatively high. That is, the processor $10a$ compares, based on the statistical information SI, occurrence rates of errors for each of the printing media names.

Figure 10:
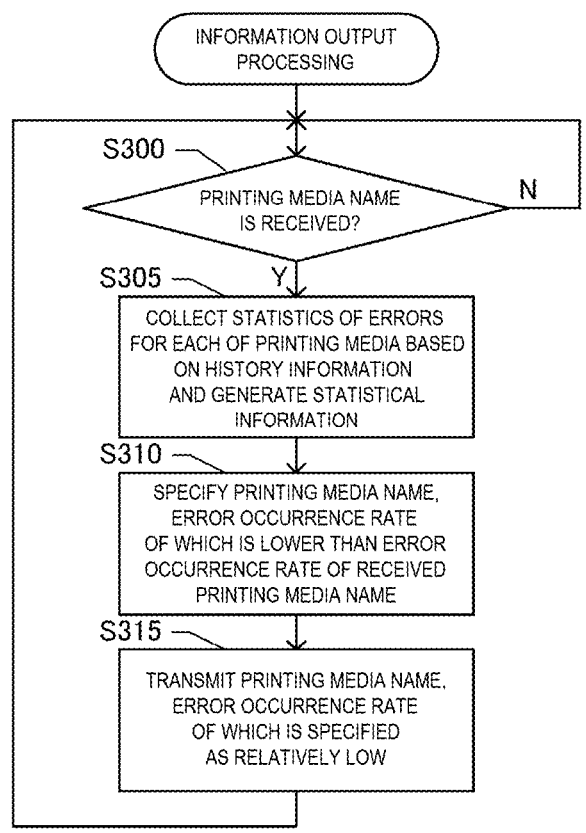
FIG. 10 is a flowchart of the information output processing.

FIG. 10 is a flowchart showing a processing example for performing an improvement proposal based on such comparison. This example is an example in which, based on a printing medium set in the printer 30 that is about to execute a printing job, a printing medium, an error occurrence rate of which can be further suppressed than in the printing medium, is proposed. Specifically, with the function of the output control section $10a3$, the processor $10a$ determines whether a printing media name set in the printer 30 that is about to execute the printing job is received (step S300). The printing media name may be specified in various forms. The user of the information processing terminal 20 may specify the printing media name using the touch panel of the display section $20d$. The printing media name may be specified by referring to the setting information of the printer 30 that is about to perform printing.

When determining in step S300 that the printing media name is received, with the function of the output control section $10a3$, the processor $10a$ collects statistics of errors for each of the printing media based on the history information HI and generates the statistical information SI (step S305). This processing is the same as step S205 explained above. Subsequently, the processor $10a$ specifies a printing media name, an error occurrence rate of which is lower than an error occurrence rate of the received printing media name (step S310). That is, the processor 10a refers to the statistical information SI generated in step S305 and specifies a printing media name, an error occurrence rate of which is lower, based on the printing media name received in step S300. As a result, a printing media name, an error occurrence rate of which is relatively lower than the error occurrence rate of a printing medium having the printing media name set in the printer 30, is specified.

For example, it is assumed that the statistical information SI concerning five kinds of printing media shown in FIG. 7 is obtained as the statistical information SI. In this example, when the printing media name set in the printer 30 is photographic paper (thin gloss), it is specified that error occurrence rates of photographic paper (thick gloss), matt paper (thick roll), and matt paper (thin roll) are relatively low. That is, it is specified that an error occurrence rate of the photographic paper (thin gloss) is relatively high.

Subsequently, the processor 10a transmits the printing media name, the error occurrence rate of which is specified as relatively low (step S315). That is, with the function of the output control section 10a3, the processor 10a transmits the printing media name, the error occurrence rate of which is specified as relatively low, via the communication section 10b and causes the display section 20d to display a screen for urging a change to a printing medium having the printing media name. That is, an improvement proposal is performed by displaying the printing media (the printing media name), the error occurrence rate of which is relatively low. A display form of the improvement proposal maybe various forms. Examples of the display form include display for highlighting the printing media name and the error occurrence rate shown in FIG. 7 and display for recommending the printing media name. With the configuration explained above, the user is capable of more easily improving an error occurrence rate.

Further, the improvement proposal may be various proposals. For example, when use of a specific printing medium is assumed in the printer 30, an improvement proposal for reducing an error occurrence rate without changing a printing medium may be performed. In this case, the processor 10a performs the improvement proposal based on the information other than the printing media name included in the history information HI (the statistical information SI). For example, it is possible to adopt, for example, a configuration in which the processor 10a causes the display section 20d to display information for urging the user to change heater temperature setting, mechanical parameters, temperature, humidity, air pressure, and the like.

That is, a change from setting of a printing medium, an error occurrence rate of which is relatively high, to setting of a printing medium, an error occurrence rate of which is relatively low, may be presented as the improvement proposal. A change from setting environment information, an error occurrence rate in which is relatively high, to setting environment information, an error occurrence rate in which is relatively low, may be presented as the improvement proposed. In the display section 20d, an item for simply urging a change maybe shown or a policy of a change maybe shown. In the latter, for example, the processor 10a generates statistical information for each heater temperature setting, mechanical parameters, temperature, humidity, and air pressure from the statistical information SI of the same printing media name as a printing media name assumed to be used in the printer 30 and specifies a condition with a relatively low error occurrence rate. It is possible to adopt, for example, a configuration in which the processor 10a causes the display section 20d to display the condition.

A setting change for the printer 30 may be performed instead of or together with the improvement proposal explained above. In this case, the processor 10a controls the printer 30 via the communication section 10b to change setting in printing a printing job to setting in which an error occurrence rate is lower. Naturally, the analysis and the control for the improvement proposals explained above may be executed in the information processing terminal 20.

The printing medium, an error occurrence rate of which is relatively high, only has to be a printing medium, an error occurrence rate of which is higher than a comparison target. The comparison target may be specified by various methods. For example, when error occurrence rates are compared about two printing media of the same type, the printing medium, an error occurrence rate of which is lower, is the comparison target. When a threshold is provided for an error occurrence rate, the threshold is the comparison target.

Further, the improvement proposal may be a proposal for avoiding occurrence of an error of a specific type. For example, when the error information indicates occurrence of a jam of a printing medium, a proposal for reducing a jam occurrence rate may be performed. Specifically, with the function of the statistical-information acquiring section 10a2, the processor 10a of the information processing apparatus 10 acquires a jam occurrence rate for each of the printing media names based on the history information HI and sets the jam occurrence rate as the statistical information SI. The jam occurrence rate can be acquired by dividing, for example, for each of the printing media names, the number of occurrences of jams by the number of executions of printing jobs.

When the jam occurrence rate is obtained, with the function of the output control section 10a3, the processor 10a specifies an improvement proposal, that is, change content based on the jam occurrence rate. For example, the processor 10a specifies, based on the statistical information SI, a printing media name, a jam occurrence rate in which is relatively lower than a jam occurrence rate in a printing media name of a printing medium set in the printer 30 that is about to execute a printing job. In this case, with the function of the output control section 10a3, the processor 10a causes the display section 20d to display a screen for urging a change from a printing medium, a jam occurrence rate in which is relatively high, set in the printer 30 that is about to execute a printing job to a printing medium, a jam occurrence rate in which is relatively low.

The improvement proposal is not limited to the change of a printing medium. For example, if statistics of jam occurrence rates are collected for each media tension of the mechanical parameters of the processor 10a, it is possible to specify medial tension, a jam occurrence rate in which is relatively lower than a jam occurrence rate in media tension set in the printer 30. In this case, with the function of the output control section 10a3, the processor 10a causes the display section 20d to display a screen for urging a change from the media tension set in the printer 30 to the media tension, the jam occurrence rate in which is relatively low.

If the processor 10a collects statistics of jam occurrence rates for each platen gap of the mechanical parameters, it is possible to specify a platen gap, a jam occurrence rate in which is relatively lower than a jam occurrence rate in a platen gap set in the printer 30. In this case, with the function of the output control section 10a3, the processor 10a causes the display section 20d to display a screen for urging a change from the platen gap set in the printer 30 to the platen gap, the jam occurrence rate in which is relatively low. With the configuration explained above, it is possible to perform an improvement proposal for reducing a jam occurrence rate. Naturally, a type of an error set as an analysis target when urging the change of a printing medium and the change of a mechanical parameter is not limited to the jam and may be other errors.

Further, an improvement proposal corresponding to a change with time of an error may be performed. For example, when the error information indicates occurrence of a jam of a printing medium, it may be predicted from a time change of a jam occurrence rate that the jam occurrence rate increases. Specifically, with the function of the statistical-information acquiring section 10a2, the processor 10a of the information processing apparatus 10 acquires a jam occurrence rate for each of the printing media names based on the history information HI and sets the jam occurrence rate as the statistical information SI. The jam occurrence rate can be acquired by dividing, for example, for each of the printing media names, the number of occurrences of jams by the number of executions of printing jobs.

The processor 10a periodically acquires the jam occurrence rate and records the jam occurrence rate in the nonvolatile memory 10c every time to specify a time change of the jam occurrence rate. When the time change of the jam occurrence rate is obtained, with the function of the output control section 10a3, the processor 10a estimates, based on the time change, whether an increase in the jam occurrence rate can occur. For example, the processor 10a specifies, based on the statistical information SI, a printing medium, a jam occurrence rate of which satisfies a standard.

Whether the standard is satisfied can be defined by various methods. For example, it is possible to adopt an example in which the standard is regarded as being satisfied when a jam occurrence rate per unit time is equal to or larger than a threshold. It is possible to adopt an example in which the standard is regarded as being satisfied when a change in the jam occurrence rate with respect to time is equal to or larger than a threshold, that is, the jam occurrence rate suddenly changes. When a printing medium, a jam occurrence rate of which satisfies the standard, is present, the processor 10a estimates that a jam occurrence rate also increases in a printing medium of the same type as the printing medium. That is, an occurrence rate of a jam of a printing medium can be affected by an environment such as expansion due to moisture absorption of the printing medium and increase.

Therefore, when a jam occurrence rate increases in a specific printing medium, it can be estimated that a jam occurrence rate also increases in a printing medium of the same type. Therefore, with the function of the output control section 10a3, the processor 10a specifies a printing medium (a printing media name) of the same type as a printing medium, a jam occurrence rate of which satisfies the standard, and causes the display section 20d to display a screen for warning about occurrence of a jam in the printing medium of the same type. With the configuration explained above, it is possible to perform a proposal for reducing possibility of an increase in a jam occurrence rate. Whether a printing medium is the same type only has to be determined in advance based on whether a change tendency of a jam occurrence rate is the same tendency. Types of printing media may be classified in advance according to materials and uses of the printing media. Naturally, a type of an error set as an analysis target when urging a change of a printing medium or a change of a mechanical parameter is not limited to the jam and may be other errors.

Further, the present disclosure is also applicable as a program executed by a computer or a method. The system, the program, and the method described above are sometimes realized as an independent apparatus or sometimes realized using components included in a plurality of apparatuses and include various forms. The system, the program, and the method can be changed as appropriate, for example, a part thereof is software and a part thereof is hardware. Further, the present disclosure is realized as a recording medium for a program for controlling the system. Naturally, the recording medium for the program may be a magnetic recording medium or may be a semiconductor memory. All recording media to be developed in future can be considered completely the same.

What is claimed is:

1. An information printing apparatus comprising:
 a history-information acquiring section configured to acquire, from a plurality of printers, history information indicating errors that occurred in the printers and printing media used in the printers;
 a statistical-information acquiring section configured to acquire, based on the history information, statistical information obtained by collecting statistics of the errors for each of the printing media; and
 an output control section configured to cause a display section to output the statistical information for each of the printing media,
 wherein the history information includes error information indicating types of the errors and printing media setting information concerning setting of the printing media,
 when the error information indicates occurrence of a jam of the printing medium,
 the statistical-information acquiring section acquires an occurrence rate of the jam, and
 the output control section causes the display section to output at least one of a screen for urging a change from the printing medium, an occurrence rate of the jam of which is relatively high, to the printing medium, an occurrence rate of the jam of which is relatively low, a screen for urging a change from media tension, an occurrence rate of the jam in which is relatively high, to the media tension, an occurrence rate of the jam in which is relatively low, and a screen for urging a change from a platen gap, an occurrence rate of the jam in which is relatively high, to the platen gap, an occurrence rate of the jam in which is relatively low.

2. The information processing apparatus according to claim 1, wherein
 the statistical-information acquiring section acquires the statistical information for at least each one kind of information of the error information and the printing media setting information, and
 the output control section causes the display section to output the statistical information for at least each one kind of information of the error information and the printing media setting information.

3. The information processing apparatus according to claim 2, wherein
 the history information includes setting environment information indicating a setting environment of the printer,
 the statistical-information acquiring section acquires the statistical information for at least each one kind of information among the error information, the printing media setting information, and the setting environment information, and the output control section causes the display section to output the statistical information for at least each one kind of information among the error information, the printing media setting information, and the setting environment information.

4. The information processing apparatus according to claim 3, wherein the output control section specifies, based on the statistical information, the printing medium, an occurrence rate of the error of which is relatively high, and causes the display section to output a screen for urging at least one of a change of the specified printing medium, a change of setting of the printing medium in using the specified printing medium, and a change of an environment indicated by the setting environment information in using the specified printing medium or controls the printer to execute the change.

5. The information processing apparatus according to claim 4, wherein
the change of the printing medium is a change from the printing medium, an occurrence rate of the error of which is relatively high, to the printing medium, an occurrence rate of the error of which is relatively low,
the change of the setting of the printing medium is a change from setting of the printing medium, an occurrence rate of the error of which is relatively high, to setting of the printing medium, an occurrence rate of the error of which is relatively low, and
the change of the setting environment information is a change from the setting environment information, an occurrence rate of the error in which is relatively high, to the setting environment information, an occurrence rate of the error in which is relatively low.

6. The information processing apparatus according to claim 2, wherein the output control section specifies, based on the statistical information, the printing medium, an occurrence rate of the error of which is relatively high, and causes the display section to output a screen for urging at least one of a change of the specified printing medium and a change of setting of the printing medium in using the specified printing medium or controls the printer to execute the change.

7. The information processing apparatus according to claim 6, wherein
the change of the printing medium is a change from the printing medium, an occurrence rate of the error of which is relatively high, to the printing medium, an occurrence rate of the error of which is relatively low, and
the change of the setting of the printing medium is a change from setting of the printing medium, an occurrence rate of the error of which is relatively high, to setting of the printing medium, an occurrence rate of the error of which is relatively low.

8. The information processing apparatus according to claim 2, wherein
when the error information indicates occurrence of a jam of the printing medium,
the statistical-information acquiring section acquires a time change of an occurrence rate of the jam, and
the output control section causes the display section to output a screen for warning about occurrence of the jam in the printing medium of a same type as the printing medium, an occurrence rate of the jam of which satisfies a standard.

9. An information processing method comprising:
acquiring, from a plurality of printers, history information indicating errors that occurred in the printers and printing media used in the printers;
acquiring, based on the history information, statistical information obtained by collecting statistics of the errors for each of the printing media; and
causing a display section to output the statistical information for each of the printing media
wherein the history information includes error information indicating types of the errors and printing media setting information concerning setting of the printing media,
when the error information indicates occurrence of a jam of the printing medium,
the statistical information includes an occurrence rate of the jam, and
the display section is caused to output at least one of a screen for urging a change from the printing medium, an occurrence rate of the jam of which is relatively high, to the printing medium, an occurrence rate of the jam of which is relatively low, a screen for urging a change from media tension, an occurrence rate of the jam in which is relatively high, to the media tension, an occurrence rate of the jam in which is relatively low, and a screen for urging a change from a platen gap, an occurrence rate of the jam in which is relatively high, to the platen gap, an occurrence rate of the jam in which is relatively low.

10. An information printing apparatus comprising:
a history-information acquiring section configured to acquire, from a plurality of printers, history information indicating errors that occurred in the printers and printing media used in the printers;
a statistical-information acquiring section configured to acquire, based on the history information, statistical information obtained by collecting statistics of the errors for each of the printing media; and
an output control section configured to cause a display section to output the statistical information for each of the printing media,
wherein the history information includes setting environment information indicating a setting environment of the printer,
the statistical-information acquiring section acquires the statistical information for of the setting environment information, and
the output control section causes the display section to output the statistical information of the setting environment information, and
the setting environment information includes for at least each one the air pressure, presence or absence of inclination of a surface on which the printer is set, presence or absence of vibration and noise, and brightness.

* * * * *